(12) United States Patent
Murakami et al.

(10) Patent No.: US 11,854,743 B2
(45) Date of Patent: Dec. 26, 2023

(54) DIELECTRIC COMPOSITION, ELECTRONIC DEVICE, AND MULTILAYER ELECTRONIC DEVICE

(71) Applicant: TDK CORPORATION, Tokyo (JP)

(72) Inventors: Taku Murakami, Tokyo (JP); Nobuto Morigasaki, Tokyo (JP); Takuma Ariizumi, Tokyo (JP); Toshihiko Kaneko, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 200 days.

(21) Appl. No.: 17/588,582

(22) Filed: Jan. 31, 2022

(65) Prior Publication Data

US 2022/0254568 A1   Aug. 11, 2022

(30) Foreign Application Priority Data

Feb. 9, 2021   (JP) ................. 2021-019253

(51) Int. Cl.
  *C04B 35/468*   (2006.01)
  *H01G 4/12*   (2006.01)
  *H01G 4/30*   (2006.01)

(52) U.S. Cl.
  CPC ....... *H01G 4/1209* (2013.01); *C04B 35/4682* (2013.01); *H01G 4/30* (2013.01); *C04B 2235/3236* (2013.01); *C04B 2235/3262* (2013.01); *C04B 2235/3418* (2013.01); *C04B 2235/768* (2013.01)

(58) Field of Classification Search
  CPC .................. C04B 35/4682; H01G 4/1227
  See application file for complete search history.

(56) References Cited

U.S. PATENT DOCUMENTS 8,592,334 B2 * 11/2013 Takano ............... H01G 4/30
                                              501/137
9,156,739 B2 * 10/2015 Morigasaki ......... H01G 4/1227
(Continued)

FOREIGN PATENT DOCUMENTS

JP    2005-029423 A    2/2005
JP    5541318 B2    7/2014

*Primary Examiner* — Karl E Group
(74) *Attorney, Agent, or Firm* — Oliff PLC

(57) ABSTRACT

A dielectric composition includes main-phase particles each including a main component having a perovskite crystal structure represented by a general formula of $ABO_3$. At least a part of the main-phase particles has a core-shell structure. The dielectric composition includes RA, RB, M, and Si. Each of A, B, RA, RB, and M is one or more elements selected from a specific element group. $S_{RA}/S_{RB} > C_{RA}/C_{RB}$ is satisfied, where $C_{RA}$ is an RA content (mol %) to the main component in terms of $RA_2O_3$, and $C_{RB}$ is an RB content (mol %) to the main component in terms of $RB_2O_3$, in the dielectric composition, and $S_{RA}$ is an average RA content (mol %), and $S_{RB}$ is an average RB content (mol %), in a shell part of the core-shell structure.

6 Claims, 3 Drawing Sheets

(56) References Cited

U.S. PATENT DOCUMENTS

2009/0246508 A1* 10/2009 Takano .................... H01G 4/30
  252/62.3 BT
2014/0240896 A1* 8/2014 Morigasaki .............. H01G 4/30
  501/138

* cited by examiner

DIELECTRIC COMPOSITION, ELECTRONIC DEVICE, AND MULTILAYER ELECTRONIC DEVICE

BACKGROUND OF THE INVENTION

The present invention relates to a dielectric composition, an electronic device, and a multilayer electronic device.

In recent years, there has been a demand for a dielectric composition having favorable temperature characteristics and high reliability under high temperature and high electric field, and an electronic device and a multilayer electronic device including the dielectric composition.

Patent Document 1 discloses an invention relating to a dielectric ceramic including a main component of $ABO_3$. In the dielectric ceramic, rare earth elements are divided into two groups, and each addition amount is limited. As a result, a dielectric ceramic excellent in temperature characteristics, relative permittivity, and high-temperature load life is obtained.

At present, however, there is a demand for a dielectric composition having more favorable temperature characteristics, relative permittivity, and high-temperature load life.

Patent Document 1: JP5541318 (B2)

BRIEF SUMMARY OF THE INVENTION

The present invention has been achieved under such circumstances. It is an object of the present invention to provide a dielectric composition or the like having favorable temperature characteristics, relative permittivity, and high-temperature load life.

To achieve the above object, a dielectric composition according to the present invention comprises main-phase particles each including a main component having a perovskite crystal structure represented by a general formula of $ABO_3$, wherein at least a part of the main-phase particles has a core-shell structure, the dielectric composition includes RA, RB, M, and Si, A is at least one selected from Ba, Sr, and Ca, B is at least one selected from Ti, Zr, and Hf, RA is at least one selected from Eu, Gd, Tb, and Dy, RB is at least one selected from Y, Ho, and Yb, M is at least one selected from Mg, Mn, V, and Cr, and $S_{RA}/S_{RB} > C_{RA}/C_{RB}$ is satisfied, where $C_{RA}$ is an RA content (mol %) to the main component in terms of $RA_2O_3$, and $C_{RB}$ is an RB content (mol %) to the main component in terms of $RB_2O_3$, in the dielectric composition, and $S_{RA}$ is an average RA content (mol %), and $S_{RB}$ is an average RB content (mol %), in a shell part of the core-shell structure.

The dielectric composition may further comprise segregation particles, wherein $\alpha/\beta < C_{RA}/C_{RB}$ may be satisfied, where $\alpha$ is an average RA content (mol %), and $\beta$ is an average RB content (mol %), in specific segregation particles mainly including RA, RB, Si, Ba, and Ti among the segregation particles.

A ratio of a total area of the specific segregation particles to a total area of the segregation particles may be 80% or more on a cross section of the dielectric composition.

$C_{RA}$ may be 0.60 mol % or more and 2.40 mol % or less, $C_{RB}$ may be 0.30 mol % or more and 1.20 mol % or less, an M content to the main component may be 0.20 mol % or more and 1.00 mol % or less in terms of MO, and a Si content to the main component may be 0.60 mol % or more and 1.80 mol % or less in terms of $SiO_2$.

An electronic device according to the present invention comprises the dielectric composition.

A multilayer electronic device according to the present invention comprises dielectric layers and electrode layers alternately stacked, wherein the dielectric layers comprise the dielectric composition.

BRIEF DESCRIPTION OF THE DRAWING(S)

DETAILED DESCRIPTION OF THE INVENTION

<1. Multilayer Ceramic Capacitor>

1.1 Overall Configuration of Multilayer Ceramic Capacitor

Figure 1A:
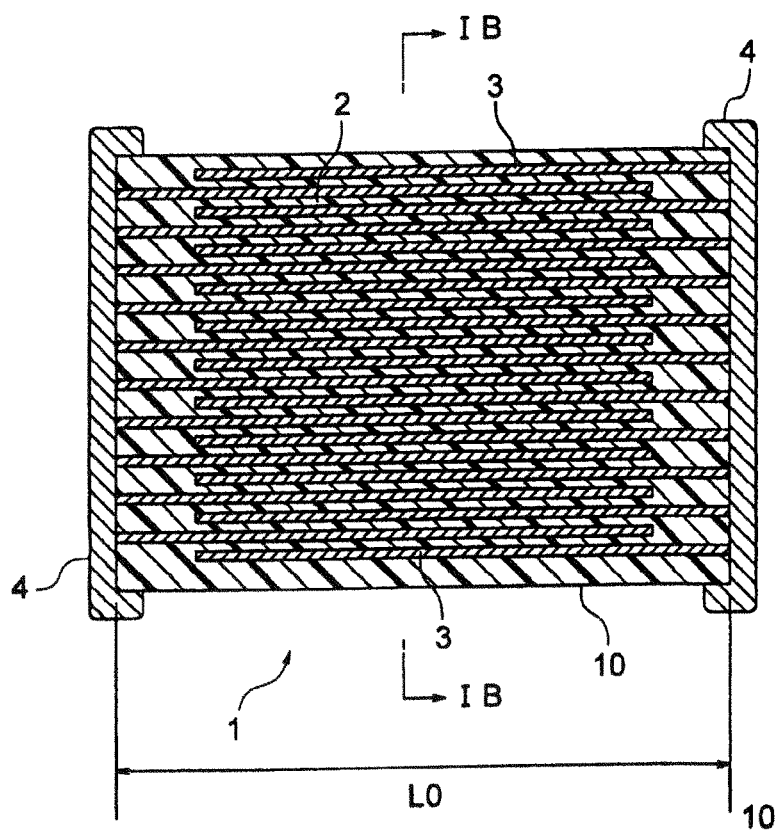
FIG. 1A is a cross-sectional view of a multilayer ceramic capacitor.
Figure 1B:
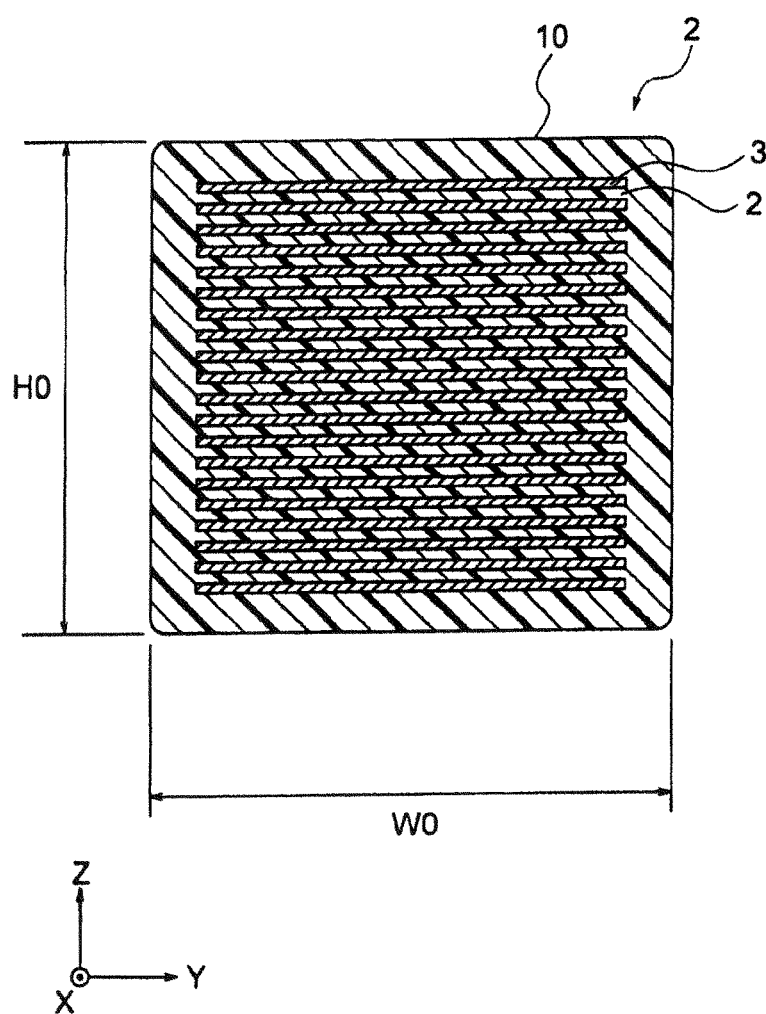
FIG. 1B is a cross-sectional view of the multilayer ceramic capacitor along the IB-IB line of FIG. 1A.

A multilayer ceramic capacitor 1 as a multilayer electronic device according to the present embodiment is shown in FIG. 1A and FIG. 1B. The multilayer ceramic capacitor 1 includes an element body 10 having a structure in which dielectric layers 2 and internal electrode layers 3 are laminated alternately. A pair of external electrodes 4 conducting with the internal electrode layers 3 alternately arranged inside the element body 10 is formed at both ends of the element body 10. The element body 10 has any shape, but normally has a rectangular parallelepiped shape. The element main body 10 has any appropriate size based on usage.

In the present embodiment, the element body 10 may have a vertical dimension L0 of 5.7-0.4 mm (see FIG. 1A), a width dimension W0 of 5.0-0.2 mm (see FIG. 1B), and a height dimension H0 of 5.0-0.2 mm (see FIG. 1B).

As a specific size of the element body 10, L0×W0 is (5.7±0.4) mm×(5.0±0.4) mm, (4.5±0.4) mm×(3.2±0.4) mm, (3.2±0.3) mm×(2.5±0.2) mm, (3.2±0.3) mm×(1.6±0.2) mm, (2.0±0.2) mm×(1.2±0.1) mm, (1.6±0.2) mm×(0.8±0.1) mm, (1.0±0.1) mm×(0.5±0.05) mm, (0.6±0.06) mm×(0.3±0.03) mm, (0.4±0.04) mm×(0.2±0.02) mm, or the like. H0 is not limited and is, for example, about the same as or less than W0.

1.2 Dielectric Layers

The dielectric layers 2 are compose of a dielectric composition according to the present embodiment mentioned below.

The thickness of the dielectric layers 2 per layer (interlayer thickness) is not limited and can freely be determined based on desired characteristics, applications, and the like. The interlayer thickness may normally be 20 μm or less, 10 μm or less, or 5 μm or less. In the multilayer ceramic capacitor of the present embodiment, the lamination number of dielectric layers 2 is not limited and may be, for example, 10 or more, 100 or more, or 200 or more.

1.3 Internal Electrode Layers

In the present embodiment, the internal electrode layers 3 are laminated so that their ends are alternately exposed on two end surfaces of the element body 10 facing each other.

The internal electrode layers 3 contain any conductive material. Examples of the noble metal used as the conductive material include Pd, Pt, and Ag—Pd alloys. Examples of the base metal used as the conductive material include Ni, Ni based alloys, Cu, and Cu based alloys. The Ni, Ni based alloys, Cu, or Cu based alloys may contain various trace components, such as P and/or S, in an amount of about 0.1 mass % or less. The internal electrode layers 3 may be formed using a commercially available electrode paste. The thickness of the internal electrode layers 3 may be determined appropriately based on usage or so.

1.4 External Electrodes

The external electrodes 4 contain any known conductive material, such as Ni, Cu, Sn, Ag, Pd, Pt, Au, alloys thereof, and conductive resins. The thickness of the external electrodes 4 may be determined appropriately based on usage or so.

<2. Dielectric Composition>

Figure 2:
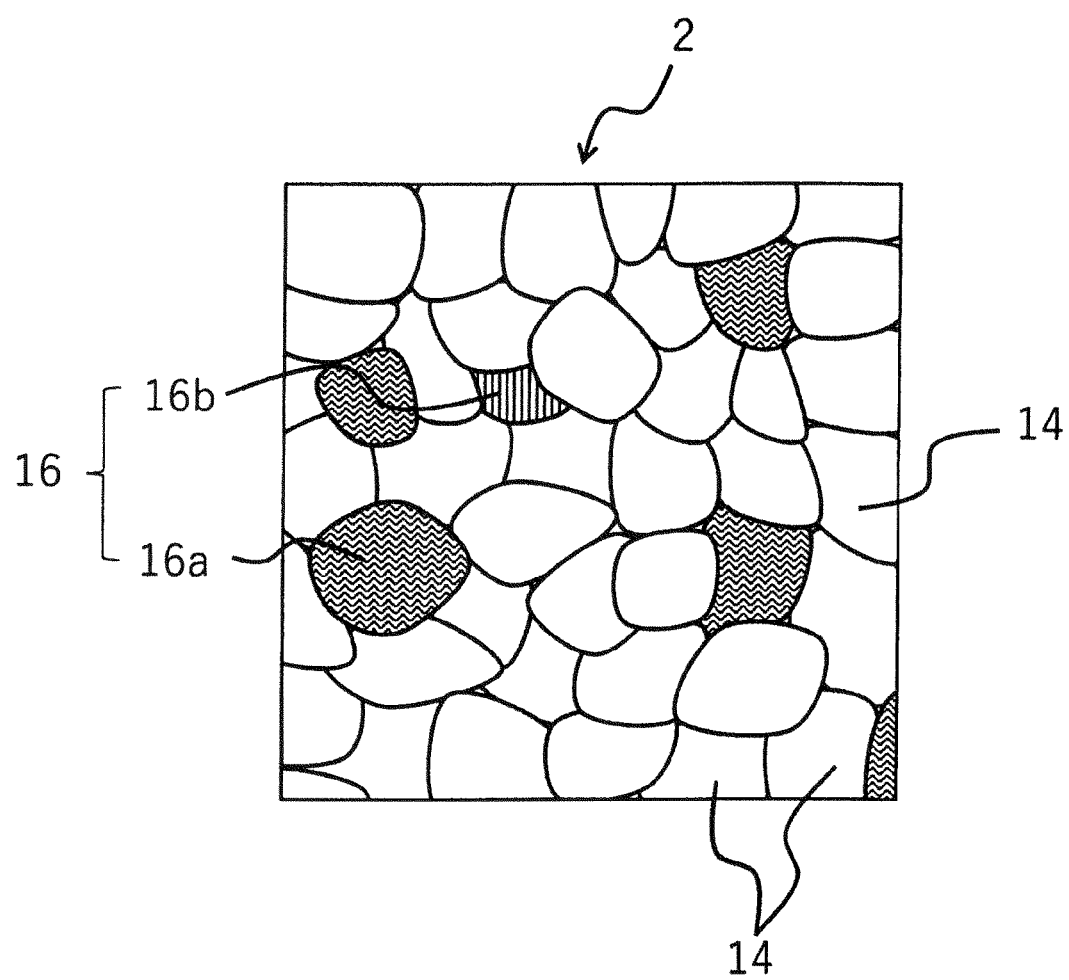
FIG. 2 is a schematic view of a cross section of a dielectric composition.

FIG. 2 is a schematic view of a dielectric composition constituting the dielectric layers 2 according to the present embodiment. As shown in FIG. 2, the dielectric composition constituting the dielectric layers 2 according to the present embodiment may include segregation particles 16 between main-phase particles 14. Then, at least a part of the segregation particles 16 may be specific segregation particles 16a mentioned below. The dielectric composition may be a dielectric ceramic composition.

2.1 Main-Phase Particles

The main-phase particles 14 of the present embodiment contain a compound having a perovskite crystal structure represented by $ABO_3$ as a main component. The main component of the main-phase particles 14 is a component that occupies 80-100 parts by mass (preferably, 90-100 parts by mass) with respect to 100 parts by mass of the main-phase particles. The main-phase particles 14 may include a component other than the above-mentioned main component and may include, for example, a barium (B a) compound.

"A" is one or more selected from Ba, strontium (Sr), and calcium (Ca). "A" may be one or more selected from Ba and Sr. Ba may be contained at 80 mol % or more with respect to "A" or may be contained at 90 mol % or more with respect to "A". "A" may be only Ba.

"B" is one or more selected from titanium (Ti), zirconium (Zr), and hafnium (Hf). "B" may be one or more selected from Ti and Zr. Ti may be contained at 70 mol % or more with respect to "B" or may be contained at 80 mol % or more with respect to "B". "B" may be only Ti.

Assuming that "A" is one or more selected from Ba, Sr, and Ca, and that "B" is one or more selected from Ti and Zr, the composition of the main component is specifically described as $\{\{Ba_{1-x-y}Ca_xSr_y\}O\}_u(Ti_{1-z}Zr_z)_yO_2$.

"x" is preferably $0 \leq x \leq 0.10$, and more preferably $0 \leq x \leq 0.05$. "y" is preferably $0 \leq y \leq 0.10$, and more preferably $0 \leq y \leq 0.05$. "z" is preferably $0 \leq z \leq 0.30$, and more preferably $0 \leq z \leq 0.15$. u/v is preferably $0.997 \leq u/v \leq 1.010$, and more preferably $0.998 \leq u/v \leq 1.005$. If u/v is too high, sintering tends to be insufficient, and the relative permittivity and the reliability of the dielectric composition also tend to decrease. If u/v is too low, the firing stability tends to deteriorate, and the temperature characteristics and the reliability of the dielectric composition tend to decrease.

Moreover, at least a part of the main-phase particles 14 has a core-shell structure. The ratio of main-phase particles each having a core-shell structure (hereinafter, also referred to as core-shell main-phase particles) to the main-phase particles 14 is not limited, but may be 50% or more based on the number of particles. The main-phase particles not having a core-shell structure may be completely solid-soluted main-phase particles (hereinafter, also referred to as complete solid solution main-phase particles).

Each of the core-shell main-phase particles is a main-phase particle in which a sub-component (one or more selected from RA, RB, M, and Si) exists only in a part (periphery) of the main-phase particle 14. Specifically, each of the core-shell main-phase particles includes a core part substantially made of only the main component and a shell part existing around the core part and having at least RA and/or RB replacing a part of A and/or B of the main component.

The core part is substantially made of only the main component, but may include a component other than the main component (sub-component etc.). For example, the core part may include a component other than the main component at 0.0 mass % to 5.0 mass %. The concentration of a component other than the main component contained in the core part is lower than that of a component other than the main component contained in the shell part.

In the present embodiment, the dielectric composition includes one or more selected from magnesium (Mg), manganese (Mn), vanadium (V), and chromium (Cr) as M. In addition, the dielectric composition includes one or more selected from europium (Eu), gadolinium (Gd), terbium (Tb), and dysprosium (Dy) as RA, one or more selected from yttrium (Y), holmium (Ho), and ytterbium (Yb) as RB, and silicon (Si). M is mainly contained in the dielectric composition as an oxide of M. M may replace B of the main component.

Among rare earth elements, RA corresponds to an element whose difference in ionic radius from the A-site atom is smaller than that of RB. Preferably, RA is one or more selected from Dy and Gd. More preferably, RA is Dy. Among rare earth elements, RB corresponds to an element whose difference in ionic radius from the A-site atom is larger than that of RA. Preferably, RB is one or more selected from Y and Ho. More preferably, RB is Y. Since RA and RB are the above-mentioned rare earth elements, the temperature characteristics and the high-temperature load life are improved easily.

An RA content $C_{RA}$ to the main component may be 0.60 mol % or more and 2.40 mol % or less in terms of $RA_2O_3$. An RB content $C_{RB}$ to the main component may be 0.20 mol % or more and 1.50 mol % or less, may be 0.20 mol % or more and 1.30 mol % or less, may be 0.30 mol % or more and 1.30 mol % or less, or may be 0.30 mol % or more and 1.20 mol % or less, in terms of $RB_2O_3$. An M content to the main component may be 0.20 mol % or more and 1.00 mol % or less in terms of MO. A Si content to the main component is 0.60 mol % or more and 1.90 mol % or less, or may be 0.60 mol % or more and 1.80 mol % or less, in terms of $SiO_2$. Since RA, RB, M, and Si are contained within the above-mentioned ranges, the dielectric composition has a favorable fine structure mentioned below, and all of the temperature characteristics, the relative permittivity, and the high-temperature load life of the dielectric composition are favorable. If only RA is contained without containing RB as the rare earth element, the temperature characteristics and high-temperature load life of the dielectric composition decrease.

If the RA content is small, most of RA are solid-soluted the main component, and the grain growth of the main component cannot be prevented. As a result, the temperature characteristics and the high-temperature load life of the dielectric composition tend to decrease. If the RA content is large, the abundance ratio of the main component in the dielectric composition tends to decrease. As a result, the relative permittivity of the dielectric composition tends to decrease. If the RB content is small, the component for preventing the grain growth of the main component becomes insufficient, and abnormal grain growth of the dielectric particles occurs. As a result, the temperature characteristics of the dielectric composition tend to decrease. If the RB content is large, the abundance ratio of the main component in the dielectric composition decreases. In addition, the grain growth of the dielectric particles is prevented more than necessary. As a result, the relative permittivity of the dielectric composition tends to decrease. If the M content is small, abnormal grain growth of the dielectric particles occurs. Along with this, the solid solution ratios of RA and RB into the segregation particles tend to change greatly, and the temperature characteristics and the high-temperature load life of the dielectric composition tend to decrease. When the M content is large, the grain growth of the dielectric particles is prevented more than necessary. As a result, the solid solution ratios of RA and RB to the segregation particles tend to change greatly, and the high-temperature load life of the dielectric composition tends to decrease. If the Si content is small, the component to be a sintering aid becomes insufficient. As a result, the sinterability of the dielectric particles tends to deteriorate, and the relative permittivity of the dielectric composition tends to decrease. If the Si content is large, a large amount of segregation particles other than the specific segregation particles are formed. As a result, the temperature characteristics and the high-temperature load life of the dielectric composition tend to decrease.

RA is a rare earth element having a relatively large ionic radius. RB is a rare earth element having a relatively small ionic radius. The smaller the ionic radius of a rare earth element is, the more difficult it is to proceed with a solid solution of the rare earth element into the main-phase particles. That is, the larger the difference between the ionic radius of the A-site atom of the main component and the ionic radius of the rare earth element becomes, the more difficult it is to proceed with a solid solution of the rare earth element into the main-phase particles. When the rare earth element replaces the A-site atom, the rare earth element is solid-soluted into the main-phase particles 14 as a donor component. When the rare earth element and M replace the B-site atom, the rare earth element and M are solid-soluted into the main-phase particles 14 as an acceptor component. When RA and RB are solid-soluted into the main-phase particles, RA tends to mainly replace A of the main component, and RB tends to mainly replace B of the main component. Thus, the more RA is solid-soluted, the lower the specific resistance becomes, but the reliability tends to improve, and the high-temperature load life tends to improve. On the contrary, the more RB is solid-soluted, the higher the specific resistance becomes, but the reliability tends to decrease, and the high-temperature load life tends to decrease.

Then, $S_{RA}/S_{RB} > C_{RA}/C_{RB}$ is satisfied, where $S_{RA}$ is an average RA content in the shell part, and $S_{RB}$ is an average RB content in the shell part. That is, RA is preferentially solid-soluted in the main-phase particles 14 as compared with RB. In this case, the temperature characteristics, the relative permittivity, and the high-temperature load life of the dielectric composition are favorable. $S_{RA}/S_{RB} - C_{RA}/C_{RB} > 0.01$ may be satisfied.

Preferably, the variation in the particle size of the main-phase particles 14 is small. Specifically, the SN ratio of the particle size is preferably high. The SN ratio of the particle size is $10 \times \log_{10}(\mu^2/\sigma^2)$ (unit: dB), where $\mu$ is an average particle size, and $\sigma$ is a standard deviation. Preferably, the SN ratio of the particle size is 7.0 dB or more.

2.2 Segregation Particles

The composition of the segregation particles 16 is not limited. The dielectric composition 2 may include the specific segregation particles 16a mainly including RA, RB, Si, Ba, and Ti as the segregation particles 16. The term of "mainly including RA, RB, Si, Ba, and Ti" means that: a total content of RA and RB is 3.0 mol % or more; a Si content is 1.0 mol % or more; a B a content is larger than a Ti content; and a total content of RA, RB, Si, Ba, and Ti to a total content of elements other than 0 is 80 mol % or more. The RA content may be 2.0 mol % or more, and the RB content may be 1.0 mol % or more.

In a cross section of the dielectric composition 2, an area ratio of the specific segregation particles 16a to the segregation particles 16 is preferably 80% or more. Examples of the segregation particles 16b other than the specific segregation particles include segregation particles mainly including RA (Dy etc.) and Ti. However, such segregation particles may reduce the high-temperature load life of the dielectric composition 2. Thus, when an area ratio of the specific segregation particles 16a to the segregation particles 16 is 80% or more, the high-temperature load life can be improved.

$\alpha/\beta < C_{RA}/C_{RB}$ is satisfied, where $\alpha$ is an average RA content (mol %), and $\beta$ is an average RB content (mol %), in the specific segregation particles 16a. That is, an RA content to an RB content in the specific segregation particles 16a is preferably smaller than an RA content to an RB content in the entire dielectric composition 2. In other words, an RB content to an RA content in the specific segregation particles 16a is preferably larger than an RB content to an RA content in the entire dielectric composition 2. $C_{RA}/C_{RB} - \alpha/\beta \geq 0.01$ may be satisfied.

As the grain growth of the main-phase particles 14 proceeds during firing, the donor component (mainly, RA) and the acceptor component (mainly, RB and M) is solid-soluted into the main-phase particles 14. At this time, if the grain growth proceeds too much, the temperature characteristics decrease. In addition, the SN ratio of the particle size mentioned above decreases. When the SN ratio of the particle size decreases, the reliability of the dielectric composition 2 decreases, and the high-temperature load life decreases.

Here, since a comparatively large amount of RB is contained in the specific segregation particles 16a (i.e., grain boundaries), the variation in the particle size of the main-phase particles 14 can be prevented, and the SN ratio of the particle size can be increased. As a result, the reliability is improved, and the high-temperature load life is extended. In addition, the particle size of the main phase particles 14 can be controlled easily. This makes it possible to improve the temperature characteristics while maintaining a high high-temperature load life.

Hereinafter, a method of observing the segregation particles 16 in the dielectric composition 2 is explained.

First, a mapping analysis is performed on measurement points of the cross section of the dielectric composition using a scanning transmission electron microscope (STEM) equipped with an energy dispersive X-ray analyzer (EDS). Hereinafter, the STEM equipped with the EDS is referred to as a STEM-EDS. The size of the measurement range is not limited. For example, the measurement range is determined so that the dielectric composition has an area of 50 μm² or more. The obtained mapping image is divided into dots of 0.02 μm/pixel or more and 0.05 μm/pixel or less, and the contrast intensity of each element at each dot is quantified. Specifically, the contrast intensity is classified into 91 stages from 0 to 90 with the lowest contrast intensity (no detection) of 0 and the highest contrast intensity of 90. A dot with a contrast intensity of 75 or more for rare earth elements is considered to be a dot with segregated rare earth elements. Then, a portion where the dots with segregated rare earth elements are gathered is considered to be a segregation particle 16. Each segregation particle 16 has an area of at least 0.005 µm². A portion smaller than 0.005 µm² is not considered to be the segregation particle.

Whether the segregation particles 16 are the specific segregation particles 16a or segregation particles 16b other than the specific segregation particles is determined by mainly including RA, RB, Si, Ba, and Ti or not. Then, a ratio of a total area of the specific segregation particles 16a to a total area of the segregation particles 16 can be calculated. In addition, α can be measured by measuring each RA content and averaging them, and β can be measured by measuring each RB content and averaging them, for all dots contained in the specific segregation particles 16a. Then, $(\alpha/\beta)/(C_{RA}/C_{RB})$ can be calculated.

Hereinafter, a method of determining whether or not each of the main-phase particles 14 is a core-shell main-phase particle. Whether or not each of the main-phase particles 14 is a core-shell main-phase particle is determined by any method and is determined by, for example, the following method.

First, the above-mentioned mapping image is formed with 30 or more main-phase particles 14 existing in a visual field. Among the portions excluding the segregation particles 16, the portion having the highest contrast intensity of the rare earth element is determined. Then, a part whose contrast intensity is 30% or more of the highest contrast intensity in the portion having the highest contrast intensity of the rare earth element is defined as a shell part of the main-phase particle 14. Moreover, the main-phase particle 14 in which the area of the shell part is 95% or less is defined as a core-shell main-phase particle. The main-phase particle 14 in which the area of the shell part is more than 95% is a complete solid solution main-phase particle. In the complete solid solution main-phase particle, the sub-component is diffused and solid-soluted in the entire main-component particle.

For all dots contained in the shell part, $S_{RA}$ can be measured by measuring and averaging an RA content, and $S_{RB}$ can be measured by measuring and averaging an RB content.

<3. Method of Manufacturing Multilayer Ceramic Capacitor>

Next, a method of manufacturing a multilayer ceramic capacitor 1 shown in FIG. 1A is explained below.

As with conventional multilayer ceramic capacitors, the multilayer ceramic capacitor 1 of the present embodiment is manufactured by producing a green chip with a normal printing method or sheet method using a paste, firing this green chip, printing or transferring external electrodes, and firing them. Hereinafter, a method of manufacturing the multilayer ceramic capacitor 1 is specifically explained.

First, dielectric raw materials for forming dielectric layers are prepared and turned into a dielectric-layer paint.

As the dielectric raw materials, a raw material of $ABO_3$ (main component) and raw materials of various other oxides are prepared. As these raw materials, oxides of the above-mentioned components, mixtures thereof, and composite oxides can be used, and various compounds to be the above-mentioned oxides, composite oxides, or the like by firing, such as carbonates, oxalates, nitrates, hydroxides, and organometallic compounds, are appropriately selected and can be used by mixing them.

In the present embodiment, it is preferable to use a mixture in which the oxides of the above-mentioned components are uniformly dispersed with respect to the main component, but a dielectric raw material in which the main component is coated with the above-mentioned components may be used. In addition to the raw materials of the main component, for example, RA oxides, RB oxides, M oxides, and Si compounds may be used.

The raw material of $ABO_3$ (main component) can be manufactured by various methods, such as various liquid-phase methods (e.g., oxalate method, hydrothermal synthesis method, alkoxide method, sol-gel method) in addition to the so-called solid-phase methods.

When the dielectric layers include components other than the above-mentioned components, oxides of those components, mixtures thereof, or composite oxides can be used as raw materials for the components. In addition, various compounds to be the above-mentioned oxides or composite oxides by firing can be used.

Each compound content in the dielectric raw materials is determined so as to have the composition of the above-mentioned dielectric composition after firing.

Any two or more of the raw materials for other various oxides mentioned above may be mixed and calcined before being mixed with the main component. For example, the raw material of the RA oxide, the raw material of the Si oxide, and the raw material of the A oxide contained separately from the main component (e.g., the raw material of the Ba oxide) may be previously mixed and calcined. The calcination temperature is less than 1100° C. Then, the compound powder obtained by calcination, the main component, and the raw materials of various oxides not subjected to calcination may be mixed. This changes the ease of solid solution of various rare earth elements into the main-phase particles and makes it easier to achieve $S_{RA}/S_{RB} > C_{RA}/C_{RB}$.

The dielectric-layer paste may be an organic based paint obtained by kneading the dielectric raw materials and an organic vehicle or may be a water based paint.

The organic vehicle is a binder dissolved in an organic solvent. Known binders and solvents are used.

When the dielectric-layer paste is a water based paint, the dielectric raw materials and a water based vehicle in which a water-soluble binder, a dispersant, and the like are dissolved in water are kneaded. The water-soluble binder is not limited and is, for example, polyvinyl alcohol, cellulose, a water-soluble acrylic resin, or the like.

An internal-electrode-layer paste is prepared by kneading the above-mentioned organic vehicle and a conductive material made of Ni or Ni alloy mentioned above or various oxides, organic metal compounds, resonates, etc. to be Ni or Ni alloy mentioned above after firing. The internal-electrode-layer paste may include an inhibitor. The inhibitor is not limited and may have a composition similar to that of the main component.

An external-electrode paste is prepared similarly to the above-mentioned internal-electrode-layer paste.

The amount of the organic vehicle in each of the above-mentioned pastes is not limited and is a normal amount, such as about 1-15% by mass for the binder and about 10-60% by mass for the solvent. If necessary, each paste may include an additive selected from various dispersants, plasticizers, dielectrics, insulators, and the like. The total amount of them may be 10% by mass or less.

When a printing method is used, the dielectric-layer paste and the internal-electrode-layer paste are printed on a substrate, such as PET, laminated, cut into a predetermined shape, and thereafter peeled off from the substrate to obtain a green chip.

When a sheet method is used, green sheets are formed using the dielectric-layer paste, the internal-electrode-layer paste is printed on the green sheets, and these are laminated and cut into a predetermined shape to obtain a green chip.

Before firing, the green chip is subjected to a binder removal treatment. As the binder removal conditions, the heating rate is preferably 5-300° C./hour, the binder removal temperature is preferably 180-900° C., and the holding time is preferably 0.5-48 hours. The atmosphere for the binder removal treatment is the air or a reducing atmosphere (e.g., a humidified $N_2+H_2$ mixed gas atmosphere).

After the binder removal, the green chip is fired. For example, the heating rate may be 200-20000° C./h, the firing temperature may be 1150-1350° C., and the holding time may be 0.1-10 hours.

The atmosphere during firing is not limited either and may be the air or a reducing atmosphere. As an atmosphere gas of the reducing atmosphere, for example, a mixed gas of $N_2$ and $H_2$ can be humidified and used. The oxygen partial pressure may be $1.0 \times 10^{-14}$ to $1.0 \times 10^{-9}$ MPa.

The lower the oxygen partial pressure during firing is, the more easily the solid solution of the rare earth element into the main-phase particles proceeds. Comparing RA with RB, the solid solution of, particularly, RA into the main-phase particles proceeds more easily. As a result, the RA content is larger than the RB content in the shell part, and $S_{RA}/S_{RB} > C_{RA}/C_{RB}$ is easily satisfied. On the contrary, the higher the oxygen partial pressure during firing is, the more difficult it is to satisfy $S_{RA}/S_{RB} > C_{RA}/C_{RB}$.

When the oxygen partial pressure during firing is low, the solid solution of the rare earth element into the main-phase particles proceeds easily. Comparing RA with RB, the solid solution of, particularly, RA into the main-phase particles tends to proceed more easily. That is, when the oxygen partial pressure during firing is low, more RB tends to remain in the grain boundaries relative to RA. Thus, the RB content in the specific segregation particles becomes large, and $\alpha/\beta < C_{RA}/C_{RB}$ is easily satisfied. When the oxygen partial pressure during firing is too low, however, most of RA are solid-soluted into the main-phase particles, and most of RB are solid-soluted into the main-phase particles. That is, the RB content in the specific segregation particles becomes small, and it is difficult to satisfy $\alpha/\beta < C_{RA}/C_{RB}$.

$S_{RA}/S_{RB}$ and $\alpha/\beta$ also change by the composition of the dielectric composition, particularly the content ratio of various oxides mentioned above.

The larger the RA content to RB is, the larger $S_{RA}/S_{RB}$ becomes. Since it is more difficult for RA to be solid-soluted as more RA are solid-soluted in the main-phase particles, however, $S_{RA}/S_{RB}$ hardly increases even if RA is added excessively. That is, it is difficult to satisfy $S_{RA}/S_{RB} > C_{RA}/C_{RB}$. The larger the RB content to RA is, the further the solid solution reaction into the main-phase particles is prevented. Thus, the larger the RB content to RA is, the smaller the solid solution amount of RA into the main-phase particles and the solid solution amount of RB into the main-phase particles are, and the smaller $S_{RA}/S_{RB}$ is. Even if the M content is too large or too small, the M content greatly affects the amounts of RA and RB solid-soluted into the main-phase particles. Then, even if the M content is too large or too small, $S_{RA}/S_{RB}$ is small. That is, it is difficult to satisfy $S_{RA}/S_{RB} > C_{RA}/C_{RB}$.

The larger the RA content to RB is, the more RA not solid-soluted into the main-phase particles tends to be, and the larger $\alpha/\beta$ tends be. The larger the RB content to RA is, the more RB not solid-soluted into the main-phase particles tends to be, and the smaller $\alpha/\beta$ tends be. Even if the M content is too large or too small, the M content greatly affects the amounts of RA and RB solid-soluted into the main-phase particles. Then, even if the M content is too large or too small, $\alpha/\beta$ tends be large.

In the present embodiment, the element body after firing is preferably subjected to an annealing treatment (an oxidation treatment of the dielectric layers). Specifically, the annealing temperature may be 950-1100° C. The holding time may be 0.1-20 hours. The atmosphere during the oxidation treatment may be a humidified $N_2$ gas (oxygen partial pressure: $1.0 \times 10^{-9}$ to $1.0 \times 10^{-6}$ MPa).

When the $N_2$ gas, the mixed gas, or the like is humidified in the above-mentioned binder removal treatment, firing, and annealing treatment, for example, a wetter is used. In this case, the water temperature is preferably about 5-75° C.

The binder removal treatment, the firing, and the annealing treatment may be performed continuously or independently.

The capacitor element body obtained as mentioned above is subjected to an end-surface polishing by barrel polishing, sandblasting, or the like, and an external-electrode paste is applied and fired to form the external electrodes 4. Then, if necessary, coating layers are formed on the surfaces of the external electrodes 4 by plating or the like.

The multilayer ceramic capacitor of the present embodiment manufactured in such a manner is mounted on, for example, a printed circuit board by soldering or the like and is used for, for example, various electronic devices.

The present invention is not limited to the above-mentioned embodiment and can variously be modified within the scope of the present invention.

In the above-mentioned embodiment, the fine structure is controlled by particularly controlling the composition and the firing conditions, but the present invention is not limited to this method.

Modified Examples

In the above-mentioned embodiment, the electronic device according to the present invention is a multilayer ceramic capacitor, but is not limited to the multilayer ceramic capacitor and may be an electronic device including the above-mentioned dielectric composition.

For example, the electronic device according to the present invention may be a single-plate ceramic capacitor in which a pair of electrodes is formed on the above-mentioned dielectric composition.

Hereinbefore, an embodiment of the present invention is explained, but the present invention is not limited to the above-mentioned embodiment and may be modified in various embodiments within the scope of the present invention.

The electronic device and the multilayer electronic device including the dielectric composition according to the present invention have high temperature characteristics, relative permittivity, and high-temperature load life and are thereby particularly favorably used for automobiles.

EXAMPLES

Hereinafter, the present invention is explained in more detail with Examples and Comparative Examples. However, the present invention is not limited to Examples below.

(Preparation of Dielectric Paste)

First, as raw material powders, a $BaTiO_3$ powder (Ba/Ti=1.000), a $RA_2O_3$ powder, a $RB_2O_3$ powder, a $SiO_2$ powder, a MgO powder, a $MnCO_3$ powder, and a $BaCO_3$ powder were prepared and weighed so that the dielectric composition having the composition of each Example and Comparative Example shown in Tables 1-5 would be obtained. The compositions shown in Tables 1-5 are those when the $BaTiO_3$ (main component) content was 100 mol %. Each example shown in Table 2 had the same composition as Example 3 except for the type of RA and the type of RB. In all experimental examples, the $BaCO_3$ powder content to the main component was 1.1 mol % in terms of BaO. For Mg and Mn contained as M, the atomic ratio was set to Mg:Mn=4:3.

Next, a dielectric raw material was manufactured. A method of manufacturing the dielectric raw material in Example 1 and Comparative Examples 1-4 in Table 1 was different from that in the other samples.

Example 1 and Comparative Examples 1-4 in Table 1: Method 1

Next, the above-mentioned raw material powders were mixed in wet manner with a ball mill for 20 hours, pulverized, and dried to obtain a dielectric raw material. $MnCO_3$ would be contained as MnO after firing. $BaCO_3$ would be contained as BaO after firing.

(Other Samples: Method 2)

The above-mentioned raw material powders were classified into a first group ($RA_2O_3$ powder, $RB_2O_3$ powder, $SiO_2$ powder, and $BaCO_3$ powder) and a second group (raw material powders other than those of the first group).

The powders of the first group were mixed in wet manner in a ball mill for 10 hours, pulverized, dried, and calcined at 600° C. for 1 hour to obtain a compound powder.

Next, the compound powder was added with the powders of the second group, mixed in wet manner in a ball mill for 20 hours, pulverized, and dried to obtain a dielectric raw material. $MnCO_3$ would be contained as MnO after firing. $BaCO_3$ would be contained as BaO after firing.

Unless otherwise specified, the following steps were common to all Examples and Comparative Examples.

Next, 10 parts by weight of polyvinyl butyral resin, 5 parts by weight of dioctyl phthalate (DOP) as a plasticizer, and 100 parts by weight of alcohol as a solvent with respect to 100 parts by weight of the dielectric raw material were mixed by a ball mill with respect to 100 parts by weight of the dielectric raw material and were turned into a dielectric-layer paste.

(Preparation of Internal-Electrode-Layer Paste)

Ni powder, terpineol, ethyl cellulose and benzotriazole were prepared to have a mass ratio of 44.6:52.0:3.0:0.4. Then, these were kneaded with a triple-roll mill and turned into an internal-electrode-layer paste.

(Preparation of Green Chip)

A green sheet was formed on a PET film using the above-mentioned dielectric-layer paste. The green sheet was adjusted so as to have a thickness of 4.0-5.0 µm after drying. Next, an electrode layer was printed in a predetermined pattern on the green sheet using the internal-electrode-layer paste. Then, the green sheet having the electrode layer was prepared by peeling the green sheet from the PET film. Next, green sheets having the electrode layers were laminated and bonded with pressure to obtain a green laminated body. A green chip was prepared by cutting this green laminated body into a predetermined size.

(Preparation of Element Body)

Next, the obtained green chip was subjected to a binder removal treatment, a firing, and an oxidation treatment to obtain an element body as a sintered body.

As the conditions for the binder removal treatment, the heating rate was 25° C./h, the binder removal temperature was 235° C., the holding time was 8 hours, and the atmosphere was the air.

As the firing conditions, the heating rate was 200° C./h, the firing temperatures were those shown in Tables 1-5, the holding time was 2 hours, and the cooling rate was 200° C./h. The atmosphere was a humidified $N_2+H_2$ mixed gas atmosphere. In Example 1, the oxygen partial pressure was about $5.0 \times 10^{-11}$ MPa. In Example 7, the oxygen partial pressure was about $1.0 \times 10^{-12}$ MPa. In the other examples and comparative examples, the oxygen partial pressure was about $1.0 \times 10^{-11}$ MPa.

As the conditions for the oxidation treatment, each of the heating rate and the cooling rate was 200° C./h, the oxidation treatment temperature was 1050° C., the holding time was 3 hours, the atmosphere was a humidified $N_2$ gas, and the oxygen partial pressure was $1.0 \times 10^{-7}$ MPa.

A wetter was used to humidify the atmospheres of the firing and oxidation treatment.

(Preparation of Multilayer Ceramic Capacitor Sample)

Next, the end surfaces of the obtained element body were subjected to barrel polishing, and a Cu paste was applied as external electrodes and baked in a reducing atmosphere to obtain a sample of the multilayer ceramic capacitor shown in FIG. 1A. The size of the obtained capacitor sample was 3.2 mm×1.6 mm×0.7 mm, the thickness of each dielectric layer was 3.2-4.2 and the thickness of each internal electrode layer was 0.8-1.2 The number of dielectric layers was 10.

(Confirmation of Segregation Particles)

The obtained multilayer ceramic capacitor sample was cut in a cross section perpendicular to the dielectric layers (a cross section in the lamination direction). STEM-EDS mapping analysis was performed on a part of the obtained cross section where the presence or absence of segregation phases was determined. In a visual field having a size where five or more internal electrode layers were observed, the obtained mapping image was divided into dots of 0.027 µm/pixel, and the contrast intensity of each element at each dot was quantified. Specifically, the contrast intensity was classified into 91 stages from 0 to 90 with the lowest contrast intensity (no detection) of 0 and the highest contrast intensity of 90. A dot having a contrast intensity of 75 or more for rare earth elements was defined as a dot in which rare earth elements were segregated. The portions where the dots with segregated rare earth elements were gathered were defined as segregation particles.

The composition of the segregation particles contained in the obtained mapping image was subjected to point analysis so as to determine whether or not each segregation particle was a specific segregation particle. Then, a ratio of a total area of specific segregation particles to a total area of segregation particles was calculated in the observation range.

Then, an average RA content α and an average RB content β in the specific segregation particles were calculated by measuring an RA content and an RB content at any three points within the specific segregation particles and averaging them. Then, whether or not $\alpha/\beta < C_{RA}/C_{RB}$ was satisfied was confirmed. $C_{RA}$ and $C_{RB}$ were confirmed by dissolving the dielectric layers with a mixed solution of hydrochloric acid and hydrogen peroxide water using ICP-AES. Specifically, it was confirmed that $C_{RA}$ was the same as the RA content shown in Tables 1-5, and that $C_{RB}$ was the same as the RB content shown in Tables 1-5. In Tables 1-5, the case where $\alpha/\beta < C_{RA}/C_{RB}$ was satisfied was considered to be good, and the case where $\alpha/\beta > C_{RA}/C_{RB}$ was satisfied was considered to be bad.

A method of measuring a particle size of each main-phase particle and a SN ratio of the particle size is explained. First, the obtained capacitor sample was cut on a surface perpendicular to the internal electrode layers, and this cut surface was polished to obtain a polished surface. Then, the polished surface was subjected to chemical etching. The polished surface after chemical etching was observed by SEM. Areas of at least about 1000 main-phase particles were measured. The values obtained by converting the measured areas into the circle equivalent diameters were considered to be particle sizes of the main-phase particles. Then, a SN ratio of the particle size was calculated from $10 \times \log_{10}(\mu^2/\sigma^2)$ (unit: dB), where $\mu$ was an average particle size, and $\sigma$ was a standard deviation. When the SN ratio of the particle size was 7.0 dB or more, the variation in the particle size of the main-phase particles was considered to be sufficiently small.

(Confirmation of Core-Shell Main-Phase Particles)

The mapping image obtained by STEM-EDS mentioned above and a reflected electron image obtained by STEM were compared to determine a particle with higher Ba and Ti concentrations than those of the surroundings as the main-phase particle. In addition, the boundary part of the main-phase particle was considered to be a grain boundary part.

Moreover, a mapping image for the total content of the rare earth element was formed with 30 or more main-phase particles existing in a visual field. The portion having the highest contrast intensity of the rare earth element among the portions excluding the segregation particles was determined. Then, a part whose brightness was 30% or more of the highest contrast intensity in the portion having the highest contrast intensity of the rare earth element was defined as a shell part of the main-phase particle. Moreover, the main-phase particle in which the area of the shell part was 95% or less was defined as a core-shell main-phase particle.

Then, an average RA content was $S_{RA}$ mol %, and an average RB content was $S_{RB}$ mol %, in the shell part of the core-shell main-phase particle. Specifically, for any 10 core-shell particles contained in a visual field, an RA content and an RB content at any three points contained in the shell part were measured. Then, $S_{RA}$ was calculated by averaging the RA content, and $S_{RB}$ was calculated by averaging the RB content. Then, $S_{RA}/S_{RB}$ was calculated from the values of $S_{RA}$ and $S_{RB}$.

(Measurement of Ceramic Characteristics)

A relative permittivity of the multilayer ceramic capacitor sample was measured using a digital LCR meter (4274A manufactured by YHP). Specifically, a capacitance after 24 hours from a heat treatment for 1 hour at 150° C. was measured. As the measurement conditions, the reference temperature was 25° C., the frequency was 1 kHz, and the input signal level (measurement voltage) was 1.0 Vrms. The relative permittivity was calculated from the capacitance. A relative permittivity of 2200 or more was considered to be good.

A high-temperature load life of the multilayer ceramic capacitor sample was evaluated by measuring a life time while holding a state where a DC voltage of 40 V/μm was being applied at 190° C. In the present examples, the life time was a time from the start of application until the insulation resistance dropped by an order of magnitude. In the present examples, the above-mentioned evaluation was performed on 20 capacitor samples, and a mean time to failure (MTTF) was calculated from the life time of each capacitor sample. The high-temperature load life was considered to be good with a MTTF of 30.0 hours or more, and the high-temperature load life was considered to be particularly good with a MTTF of 40.0 hours or more.

A method of measuring a capacitance change rate and a method of evaluating it are shown below. First, capacitances of the multilayer ceramic capacitor sample at −55° C. to 125° C. were measured under the conditions of frequency: 1.0 kHz and input signal level (measurement voltage): 1.0 Vrms. Next, a capacitance change rate was calculated based on the capacitance at 25° C. and was evaluated whether or not the X7S characteristic, which is the temperature characteristic of the EIA standard, was satisfied. Tables 1-5 show the capacitance change rate at 125° C. It was confirmed that the capacitance change rate at −55° C. also satisfied the X7S characteristic in the sample in which the capacitance change rate at 125° C. was within ±22.0%.

In the determination columns of Tables 1-5, the case where the relative permittivity was 2200 or more, the capacitance change rate was within the range of ±22.0%, and the MTTF was 40.0 hours or more was represented by "AA", the case where the relative permittivity was 2200 or more, the capacitance change rate was within the range of ±22.0%, and the MTTF was 30.0 hours or more and less than 40.0 hours was represented by "A", and the case where one or more of the relative permittivity, the capacitance change rate, and the high-temperature load life was not good was represented by "B".

TABLE 1

| | Composition | | | | | | Fine Structure | | Characteristics |
|---|---|---|---|---|---|---|---|---|---|
| | | | | | | | | Ratio of Specific | SN | |
| Ex./Comp. Ex. | RA(Dy) [mol %] | RB(Y) [mol %] | M [mol %] | Si [mol %] | $S_{RA}/S_{RB}>$ $C_{RA}/C_{RB}$ | $\alpha/\beta<$ $C_{RA}/C_{RB}$ | Segregation Particles | Ratio [dB] | Capacitance Change Rate |
| Ex. 1 | 1.5 | 1.5 | 0.70 | 1.1 | good | good | 68% | 7.0 | −11.1% |
| Ex. 2 | 1.8 | 0.7 | 0.70 | 1.1 | good | good | 72% | 7.3 | −14.3% |
| Ex. 3 | 2.4 | 0.9 | 0.70 | 1.1 | good | good | 92% | 7.5 | −13.3% |
| Comp. Ex. 1 | 1.5 | 1.5 | 0.70 | 1.1 | bad | good | 69% | 6.6 | −10.8% |
| Comp. Ex. 2 | 1.8 | 0.7 | 0.70 | 1.1 | bad | good | 82% | 7.1 | −12.8% |

TABLE 1-continued

| | | | | | | | | | |
|---|---|---|---|---|---|---|---|---|---|
| Comp. Ex. 3 | 2.4 | 0.9 | 0.70 | 1.1 | bad | good | 85% | 8.0 | −11.5% |
| Comp. Ex. 4 | 3.0 | 0.0 | 0.70 | 1.1 | — | — | 75% | 6.2 | −20.9% |

| | Characteristics | | Method of Manufacturing Dielectric Raw Material | Firing Conditions | |
|---|---|---|---|---|---|
| Ex./Comp. Ex. | Relative Permittivity [−] | MTTF [h] | Determination | | Firing Temperature [° C.] | Oxygen Partial Pressure [MPa] |
| Ex. 1 | 2267 | 32.7 | A | method 1 | 1280 | $5.0 \times 10^{-11}$ |
| Ex. 2 | 2475 | 37.0 | A | method 2 | 1260 | $1.0 \times 10^{-11}$ |
| Ex. 3 | 2384 | 42.3 | AA | method 2 | 1280 | $1.0 \times 10^{-11}$ |
| Comp. Ex. 1 | 2207 | 4.9 | B | method 1 | 1280 | $1.0 \times 10^{-11}$ |
| Comp. Ex. 2 | 2409 | 11.8 | B | method 1 | 1260 | $1.0 \times 10^{-11}$ |
| Comp. Ex. 3 | 2243 | 16.8 | B | method 1 | 1280 | $1.0 \times 10^{-11}$ |
| Comp. Ex. 4 | 2665 | 4.8 | B | method 1 | 1260 | $1.0 \times 10^{-11}$ |

TABLE 2

| | Composition | | Fine Structure | | Ratio of Specific Segregation Particles | SN Ratio [dB] | Characteristics | | |
|---|---|---|---|---|---|---|---|---|---|
| Ex./Comp. Ex. | RA | RB | $S_{RA}/S_{RB}>$ $C_{RA}/C_{RB}$ | $\alpha/\beta<$ $C_{RA}/C_{RB}$ | | | Capacitance Change Rate | Relative Permittivity [−] | MTTF [h] |
| Ex. 3 | Dy | Y | good | good | 0.92 | 7.5 | −13.3% | 2384 | 42.3 |
| Ex. 4 | Gd | Y | good | bad | 0.82 | 7.2 | −21.1% | 2762 | 32.1 |
| Ex. 5 | Dy | Ho | good | bad | 0.75 | 7.9 | −14.3% | 2461 | 38.7 |
| Ex. 6 | Dy:Gd= 1:1 | Y:Ho= 1:1 | good | good | 0.73 | 7.1 | −18.3% | 2614 | 40.6 |

| Ex./Comp. Ex. | Characteristics Determination | Method of Manufacturing Dielectric Raw Material | Firing Conditions | |
|---|---|---|---|---|
| | | | Firing Temperature [° C.] | Oxygen Partial Pressure [MPa] |
| Ex. 3 | AA | method 2 | 1280 | $1.0 \times 10^{-11}$ |
| Ex. 4 | A | method 2 | 1240 | $1.0 \times 10^{-11}$ |
| Ex. 5 | A | method 2 | 1260 | $1.0 \times 10^{-11}$ |
| Ex. 6 | AA | method 2 | 1240 | $1.0 \times 10^{-11}$ |

TABLE 3

| | Composition | | | | Fine Structure | | Ratio of Specific Segregation Particles | SN Ratio [dB] | Characteristics |
|---|---|---|---|---|---|---|---|---|---|
| Ex./Comp. Ex. | RA(Dy) [mol %] | RB(Y) [mol %] | M [mol %] | Si [mol %] | $S_{RA}/S_{RB}>$ $C_{RA}/C_{RB}$ | $\alpha/\beta<$ $C_{RA}/C_{RB}$ | | | Capacitance Change Rate |
| Ex. 3 | 2.4 | 0.9 | 0.70 | 1.1 | good | good | 92% | 7.5 | −12.0% |
| Ex. 7 | 2.4 | 0.9 | 0.70 | 1.1 | good | bad | 75% | 7.1 | −19.2% |
| Comp. Ex. 5 | 1.6 | 1.6 | 0.70 | 1.1 | bad | bad | 65% | 6.3 | −9.8% |

TABLE 3-continued

| Ex./Comp. Ex. | Characteristics | | | Method of Manufacturing Dielectric Raw Material | Firing Conditions | |
|---|---|---|---|---|---|---|
| | Relative Permittivity [-] | MTTF [h] | Determination | | Firing Temperature [° C.] | Oxygen Partial Pressure [MPa] |
| Ex. 3 | 2384 | 42.3 | AA | method 2 | 1280 | $1.0 \times 10^{-11}$ |
| Ex. 7 | 2836 | 32.3 | A | method 2 | 1260 | $1.0 \times 10^{-12}$ |
| Comp. Ex. 5 | 2165 | 20.5 | B | method 2 | 1280 | $1.0 \times 10^{-11}$ |

TABLE 4

| Ex./Comp. Ex. | Composition | | | | Fine Structure | | Ratio of Specific Segregation Particles | SN Ratio [dB] | Characteristics Capacitance Change Rate |
|---|---|---|---|---|---|---|---|---|---|
| | RA(Dy) [mol %] | RB(Y) [mol %] | M [mol %] | Si [mol %] | $S_{RA}/S_{RB} > C_{RA}/C_{RB}$ | $\alpha/\beta < C_{RA}/C_{RB}$ | | | |
| Ex. 3 | 2.4 | 0.9 | 0.70 | 1.1 | good | good | 92% | 7.5 | −12.0% |
| Ex. 7 | 2.4 | 0.9 | 0.70 | 1.1 | good | bad | 75% | 7.1 | −19.2% |
| Ex. 2 | 1.8 | 0.7 | 0.70 | 1.1 | good | good | 72% | 7.3 | −14.5% |

| Ex./Comp. Ex. | Characteristics | | | Method of Manufacturing Dielectric Raw Material | Firing Conditions | |
|---|---|---|---|---|---|---|
| | Relative Permittivity [-] | MTTF [h] | Determination | | Firing Temperature [° C.] | Oxygen Partial Pressure [MPa] |
| Ex. 3 | 2384 | 42.3 | AA | method 2 | 1280 | $1.0 \times 10^{-11}$ |
| Ex. 7 | 2836 | 32.3 | A | method 2 | 1260 | $1.0 \times 10^{-12}$ |
| Ex. 2 | 2475 | 37.0 | A | method 2 | 1280 | $1.0 \times 10^{-11}$ |

TABLE 5

| Ex./Comp. Ex. | Composition | | | | Fine Structure | | Ratio of Specific Segregation Particles | SN Ratio [dB] | Characteristics Capacitance Change Rate |
|---|---|---|---|---|---|---|---|---|---|
| | RA(Dy) [mol %] | RB(Y) [mol %] | M [mol %] | Si [mol %] | $S_{RA}/S_{RB} > C_{RA}/C_{RB}$ | $\alpha/\beta < C_{RA}/C_{RB}$ | | | |
| Comp. Ex. 6 | 0.5 | 0.8 | 0.70 | 1.1 | bad | good | 59% | 7.2 | −22.2% |
| Ex. 8 | 0.6 | 0.8 | 0.70 | 1.1 | good | good | 77% | 7.1 | −20.8% |
| Ex. 9 | 1.8 | 0.8 | 0.70 | 1.2 | good | good | 89% | 8.2 | −13.1% |
| Ex. 10 | 2.4 | 0.8 | 0.70 | 1.3 | good | good | 85% | 8.5 | −9.5% |
| Comp. Ex. 7 | 2.5 | 0.8 | 0.70 | 1.3 | bad | good | 80% | 7.6 | −9.0% |
| Ex. 11 | 1.8 | 0.2 | 0.70 | 1.2 | good | good | 81% | 6.8 | −21.9% |
| Ex. 12 | 1.8 | 0.3 | 0.70 | 1.2 | good | good | 80% | 7.4 | −15.2% |
| Ex. 9 | 1.8 | 0.8 | 0.70 | 1.2 | good | good | 89% | 8.2 | −13.1% |
| Ex. 13 | 1.8 | 1.2 | 0.80 | 1.2 | good | good | 86% | 7.7 | −13.1% |
| Comp. Ex. 7a | 1.8 | 1.3 | 0.80 | 1.2 | bad | good | 84% | 8.1 | −12.3% |
| Comp. Ex. 8 | 1.8 | 0.8 | 0.10 | 1.2 | bad | good | 77% | 6.1 | −25.9% |
| Ex. 15 | 1.8 | 0.8 | 0.20 | 1.2 | good | good | 83% | 7.4 | −19.3% |
| Ex. 9 | 1.8 | 0.8 | 0.70 | 1.2 | good | good | 89% | 8.2 | −13.1% |
| Ex. 16 | 1.8 | 0.8 | 1.00 | 1.2 | good | good | 84% | 8.4 | −8.7% |
| Comp. Ex. 9 | 1.8 | 0.8 | 1.10 | 1.2 | bad | good | 74% | 8.4 | −8.6% |
| Comp. Ex. 10 | 1.8 | 0.8 | 0.60 | 0.5 | bad | good | 63% | 5.9 | −10.0% |
| Ex. 17 | 1.8 | 0.8 | 0.60 | 0.6 | good | good | 74% | 7.5 | −10.7% |
| Ex. 9 | 1.8 | 0.8 | 0.70 | 1.2 | good | good | 89% | 8.2 | −13.1% |

TABLE 5-continued

| Ex. 18 | 1.8 | 0.8 | 0.80 | 1.8 | good | good | 82% | 7.5 | −21.5% |
| Ex. 19 | 1.8 | 0.8 | 0.80 | 1.9 | good | good | 81% | 6.8 | −21.6% |

| | Characteristics | | | Method of Manufacturing Dielectric Raw Material | Firing Conditions | |
|---|---|---|---|---|---|---|
| Ex./Comp. Ex. | Relative Permittivity [−] | MTTF [h] | Determination | | Firing Temperature [° C.] | Oxygen Partial Pressure [MPa] |
| Comp. Ex. 6 | 3608 | 21.8 | B | method 2 | 1240 | $1.0 \times 10^{-11}$ |
| Ex. 8 | 3641 | 40.6 | AA | method 2 | 1240 | $1.0 \times 10^{-11}$ |
| Ex. 9 | 2363 | 50.3 | AA | method 2 | 1260 | $1.0 \times 10^{-11}$ |
| Ex. 10 | 2268 | 43.8 | AA | method 2 | 1280 | $1.0 \times 10^{-11}$ |
| Comp. Ex. 7 | 2104 | 34.5 | B | method 2 | 1280 | $1.0 \times 10^{-11}$ |
| Ex. 11 | 2739 | 30.3 | A | method 2 | 1240 | $1.0 \times 10^{-11}$ |
| Ex. 12 | 2748 | 44.8 | AA | method 2 | 1240 | $1.0 \times 10^{-11}$ |
| Ex. 9 | 2363 | 50.3 | AA | method 2 | 1260 | $1.0 \times 10^{-11}$ |
| Ex. 13 | 2347 | 49.8 | AA | method 2 | 1280 | $1.0 \times 10^{-11}$ |
| Comp. Ex. 7a | 2172 | 47.8 | B | method 2 | 1280 | $1.0 \times 10^{-11}$ |
| Comp. Ex. 8 | 3130 | 9.7 | B | method 2 | 1220 | $1.0 \times 10^{-11}$ |
| Ex. 15 | 2849 | 41.5 | AA | method 2 | 1240 | $1.0 \times 10^{-11}$ |
| Ex. 9 | 2363 | 50.3 | AA | method 2 | 1260 | $1.0 \times 10^{-11}$ |
| Ex. 16 | 2429 | 42.2 | AA | method 2 | 1280 | $1.0 \times 10^{-11}$ |
| Comp. Ex. 9 | 2417 | 24.8 | B | method 2 | 1280 | $1.0 \times 10^{-11}$ |
| Comp. Ex. 10 | 2053 | 35.3 | B | method 2 | 1280 | $1.0 \times 10^{-11}$ |
| Ex. 17 | 2377 | 48.8 | AA | method 2 | 1280 | $1.0 \times 10^{-11}$ |
| Ex. 9 | 2363 | 50.3 | AA | method 2 | 1260 | $1.0 \times 10^{-11}$ |
| Ex. 18 | 2488 | 42.9 | AA | method 2 | 1260 | $1.0 \times 10^{-11}$ |
| Ex. 19 | 2543 | 35.5 | A | method 2 | 1260 | $1.0 \times 10^{-11}$ |

Table 1 shows Examples and Comparative Examples in which RA, RB, M, and/or Si content was/were mainly changed with Dy (RA) and Y (RB) and the method of mixing the raw material powder and the oxygen partial pressure were further changed.

In each Example satisfying $S_{RA}/S_{RB} > C_{RA}/C_{RB}$, good characteristics were obtained, and the determination was A or AA. In addition, the higher the SN ratio of the particle size of the main-phase particles was, the further the reliability tended to be improved, and the higher the high-temperature load life tended to be.

On the other hand, in Comparative Examples 1-3 (the oxygen partial pressure or the method of manufacturing the dielectric raw material was changed from that of Examples 1-3), $S_{RA}/S_{RB} > C_{RA}/C_{RB}$ was not satisfied. In Comparative Examples 1-3, the RA content in the shell part was comparatively small. That is, RA, which mainly becomes a donor component, was not preferentially solid-soluted in the main-phase particles. As a result, the high-temperature load life decreased.

In Comparative Example 4 (RB was not contained), the grain growth prevention effect of RB was not exhibited. As a result, the grain growth was excessive to deteriorate the SN ratio of the particle size of the main-phase particles, and good characteristics could not thereby be obtained.

Table 2 shows Examples carried out with the same conditions as Example 3 except for changing the type of RA and the type of RB and except for the firing temperature. Even though the type of RA and the type of RB were changed, good characteristics were obtained.

Table 3 shows Example 7 (the firing conditions (mainly, the oxygen partial pressure) were changed from those of Example 3) and Comparative Example 5 (the composition was changed from that of Example 3).

In Example 7, $S_{RA}/S_{RB} > C_{RA}/C_{RB}$ was satisfied, but $\alpha/\beta < C_{RA}/C_{RB}$ was not satisfied. As a result, compared with Example 3, the RB content in the grain boundaries (segregation particles) was smaller, and the grain growth of the main-phase particles could not be prevented sufficiently. As a result, the SN ratio of the particle size of the main-phase particles in Example 7 was lower than that in Example 3. Then, the temperature characteristics of Example 7 were lower than those of Example 3. In addition, the reliability decreased, and the high-temperature load life decreased.

In Comparative Example 5, $S_{RA}/S_{RB} > C_{RA}/C_{RB}$ and $\alpha/\beta < C_{RA}/C_{RB}$ were not satisfied. As a result, the relative permittivity decreased, the reliability decreased, and the high-temperature load life decreased.

In addition to Example 3 and Example 7, Table 4 shows Example 2 of Table 1.

Table 4 shows that the reliability of Example 7 (the ratio of the specific segregation particles was small) and the reliability Example 2 (the ratio of the specific segregation particles was small) were lower than that of Example 3.

Examples of segregation particles other than the specific segregation particles include (RA, RB)—Ti segregation particles mainly including Ti along with RA and RB and not including Si. When such segregation particles increase, the ratio of RA and RB (particularly, RA), which are solid-soluted into in the main-phase particles, decreases. As a result, it is considered that the reliability decreased. In addition, when such segregation particles increase, Ti defects are generated in the main-phase particles. As a result, it is considered that the reliability decreased.

Table 5 shows Examples and Comparative Examples whose RA content, RB content, M content, and Si content were changed. Comparing with Comparative Examples ($S_{RA}/S_{RB} > C_{RA}/C_{RB}$ was not satisfied), the characteristics of all Examples ($S_{RA}/S_{RB} > C_{RA}/C_{RB}$ was satisfied) were improved.

Specifically, in Comparative Example 6 (the RA content was small), $S_{RA}/S_{RB} > C_{RA}/C_{RB}$ was not satisfied, and the capacitance change rate did not satisfy the X7S characteristic. This is probably because the shortage of the total addition amount of components other than the main component made it impossible to sufficiently prevent the grain growth and made it excessive. In addition, the reliability decreased, and the high-temperature load life decreased. In Comparative Example 7 (the RA content was large), $S_{RA}/S_{RB} > C_{RA}/C_{RB}$ was not satisfied, and the relative permittivity decreased. This is probably because the total addition amount of components other than the main component was excessive.

In Example 11 (the RB content was small), the temperature characteristics decreased as compared with Examples 9, 12, and 13. In addition, the reliability decreased, and the high-temperature load life decreased. This is probably because the grain growth of the main-phase particles could not sufficiently be prevented due to smallness of the RB content as compared with Examples 9, 12, and 13. In Comparative Example 7a (the RB content was large), $S_{RA}/S_{RB} > C_{RA}/C_{RB}$ was not satisfied, and the relative permittivity decreased.

In Comparative Example 8 (the M content was small), $S_{RA}/S_{RB} > C_{RA}/C_{RB}$ was not satisfied, and the capacitance change rate did not satisfy the X7S characteristic. In addition, the reliability decreased, and the high-temperature load life decreased. This is probably because the grain growth of the main-phase particles could not sufficiently be prevented due to smallness of the M content. In Comparative Example 9 (the M content was large), $S_{RA}/S_{RB} > C_{RA}/C_{RB}$ was not satisfied, the reliability decreased, and the high-temperature load life decreased. This is probably because the grain growth was prevented excessively, and the solid solution amount of the donor component into the main-phase particles was insufficient.

In Comparative Example 10 (the Si content was small), $S_{RA}/S_{RB} > C_{RA}/C_{RB}$ was not satisfied, and the relative permittivity decreased. This is probably because the sintering promotion effect of Si was insufficient, and the grain growth of the main-phase particles was insufficient. In Example 19 (the Si content was large), the temperature characteristics decreased as compared with Examples 9, 17, and 18. In addition, the reliability decreased, and the high-temperature load life decreased. This is probably because the sintering promotion effect of Si was excessive, and the grain growth of the main-phase particles was excessive as compared with Examples 9, 17, and 18.

DESCRIPTION OF THE REFERENCE NUMERICAL

1 . . . multilayer ceramic capacitor
10 . . . element body
2 . . . dielectric layer
14 . . . main-phase particle
16 . . . segregation particle
16a . . . specific segregation particle
16b . . . segregation particle (other than specific segregation particle)
3 . . . internal electrode layer
4 . . . external electrode

What is claimed is:

1. A dielectric composition comprising main-phase particles each including a main component having a perovskite crystal structure represented by a general formula of $ABO_3$, wherein
at least a part of the main-phase particles has a core-shell structure,
the dielectric composition includes RA, RB, M, and Si,
A is at least one selected from Ba, Sr, and Ca,
B is at least one selected from Ti, Zr, and Hf,
RA is at least one selected from Eu, Gd, Tb, and Dy,
RB is at least one selected from Y, Ho, and Yb,
M is at least one selected from Mg, Mn, V, and Cr, and
$S_{RA}/S_{RB} > C_{RA}/C_{RB}$ is satisfied, where
$C_{RA}$ is an RA content (mol %) to the main component in terms of $RA_2O_3$, and $C_{RB}$ is an RB content (mol %) to the main component in terms of $RB_2O_3$, in the dielectric composition, and
$S_{RA}$ is an average RA content (mol %), and $S_{RB}$ is an average RB content (mol %), in a shell part of the core-shell structure.

2. The dielectric composition according to claim 1, further comprising segregation particles, wherein $\alpha/\beta < C_{RA}/C_{RB}$ is satisfied,
where $\alpha$ is an average RA content (mol %), and $\beta$ is an average RB content (mol %), in specific segregation particles mainly including RA, RB, Si, Ba, and Ti among the segregation particles.

3. The dielectric composition according to claim 2, wherein a ratio of a total area of the specific segregation particles to a total area of the segregation particles is 80% or more on a cross section of the dielectric composition.

4. The dielectric composition according to claim 1, wherein
$C_{RA}$ is 0.60 mol % or more and 2.40 mol % or less,
$C_{RB}$ is 0.30 mol % or more and 1.20 mol % or less,
an M content to the main component is 0.20 mol % or more and 1.00 mol % or less in terms of MO, and
a Si content to the main component is 0.60 mol % or more and 1.80 mol % or less in terms of $SiO_2$.

5. An electronic device comprising the dielectric composition according to claim 1.

6. A multilayer electronic device comprising dielectric layers and electrode layers alternately stacked, wherein the dielectric layers comprise the dielectric composition according to claim 1.

* * * * *